(12) United States Patent
Hirai

(10) Patent No.: US 6,222,978 B1
(45) Date of Patent: *Apr. 24, 2001

(54) VIDEO SIGNAL COPY GUARD APPARATUS AND METHOD

(75) Inventor: Jun Hirai, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/854,420

(22) Filed: May 12, 1997

(30) Foreign Application Priority Data

Nov. 5, 1996 (JP) .................................................. 8-140750

(51) Int. Cl.[7] ........................................................ H04N 9/00
(52) U.S. Cl. .............................. 386/1; 386/94; 380/204; 380/213
(58) Field of Search ........................... 386/1, 94; 360/60; 380/5, 10, 22, 3, 15, 20, 204, 213

(56) References Cited

U.S. PATENT DOCUMENTS

| | | | | |
|---|---|---|---|---|
| 4,577,216 | * | 3/1986 | Ryan | 386/94 |
| 5,251,041 | * | 10/1993 | Young et al. | 386/94 |
| 5,585,929 | * | 12/1996 | Young et al. | 386/94 |

* cited by examiner

*Primary Examiner*—Chris Kelley
*Assistant Examiner*—Christopher Onuaku
(74) *Attorney, Agent, or Firm*—Frommer Lawrence & Haug, LLP.; William S. Frommer; Bruno Polito

(57) ABSTRACT

A video signal copy guard system in which a special color burst signal (or "copy prohibition signal") is inserted into the video signal to be copy protected so that the protected signal includes both a special color burst signal and a normal color burst signal. The special color burst signal is placed adjacent to the normal color burst signal, and its phase, frequency, and/or amplitude is varied with respect to the normal color burst signal. The special color burst signal interferes with the normal color burst signal when an analog VCR attempts to process the protected signal. Thereby, preventing unauthorized dubbing of the protected signal.

8 Claims, 9 Drawing Sheets

VIDEO SIGNAL COPY GUARD APPARATUS AND METHOD

FIELD OF THE INVENTION

This invention relates to the recording and reproducing of video signals, and more particularly to a system and method for preventing the unauthorized copying of video signals.

BACKGROUND OF THE INVENTION

There are many well known systems for recording and reproducing video signals. For example, an analog video cassette recorder (VCR) may be used to record analog video signals on a magnetic tape and to play back analog video signals that have been recorded on a magnetic tape. In order to prevent systems such as the VCR from being used to create unauthorized copies of copyrighted works, various copy guard techniques have been proposed. Two current copy guard techniques are the Automatic Gain Control (AGC) pulse technique and the color stripe technique.

In AGC pulse systems, pulses with an amplitude greater than the normal AGC reference level are placed in the AGC reference level detecting interval of a video signal. For example, as shown in FIGS. 1A and 1B, pseudo sync pulses are placed in the vertical blanking interval of a video signal (FIG. 1B is an enlarged view of a portion of the signal shown in FIG. 1A). In the depicted example, five pseudo sync pulses are inserted into the video signal at a point in time immediately following a horizontal synchronizing pulse and a color burst pulse. The amplitude of the inserted pulses is equal to the normal AGC reference level plus "p", where p is variable.

The effect of the inserted pulses is to interfere with a VCR's calculation of the AGC reference level, and thereby prevent satisfactory recording and playback of the video signal. As shown in FIG. 1C, many VCRs set the AGC reference level according to the amplitude of the horizontal sync pulse. However, when pseudo sync pulses are inserted, a VCR is "fooled" into using the inserted pulses to set the AGC reference level. Accordingly, as shown in FIG. 2A, the AGC reference level is erroneously determined to be the normal AGC reference level plus "p". The erroneously high AGC reference level causes the VCR's control circuits to greatly reduce the video gain. Consequently, as shown in FIG. 2B, the amplitude of the reproduced horizontal sync pulses is reduced to a level that is undetectable, and the video signal cannot be properly reproduced. TV monitors, however, use an AGC system that differs from that of analog VCRs and can adequately display reproduced images notwithstanding the pseudo sync pulses.

A drawback of the AGC pulse technique is that it does not always provide adequate copy guard protection. VCRs having long AGC time constants, such as β system VCRs, 8 mm VCRs, and some VHS system VCRs, are not particularly sensitive to pseudo sync pulses. To account for this, the color stripe technique has been proposed.

In a color stripe system, the phase of the color burst signal in the reproduced video signal is inverted every N-out-of-M lines. For example, the phase of the color burst signal is inverted every 4 out of 21 lines. When a video signal processed by the color stripe system is recorded on an analog VCR, the Automatic Phase Control (APC) circuit of the VCR erroneously recognizes the phase-inverted color burst signals as original color burst signals. This results in an inversion of colors in the video lines having the inverted color burst phases. Consequently, when the signal recorded by the VCR is reproduced, color-inverted lines appear in the displayed image as shown in FIG. 3. TV receivers, however, typically use long time constant APC circuits, and thus the picture they generate is unaffected when the phase of the color burst signal is inverted in only four lines.

A drawback of the color stripe technique is that some TV receivers use small time constant APC circuits, and therefore when these receivers display signals processed by a color stripe system, the displayed image includes color-inverted lines.

OBJECTS AND SUMMARY OF THE INVENTION

It is an object of the invention to provide an improved video signal copy guard apparatus and method.

In accordance with the invention, a special color burst signal (or "copy prohibition signal") is inserted into the video signal to be copy protected so that the protected signal includes both a special color burst signal and a normal color burst signal. The special color burst signal is placed adjacent to the normal color burst signal, and its phase, frequency, and/or amplitude is varied with respect to the normal color burst signal. The special color burst signal interferes with the normal color burst signal when an analog VCR attempts to process the protected signal. Thereby, preventing unauthorized dubbing of the protected signal.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, and in which.

DETAILED DESCRIPTION OF CERTAIN PREFERRED EMBODIMENTS

To facilitate an understanding of the invention, the operation of a typical VCR will be described prior to describing particular embodiments of the invention.

Figure 4:
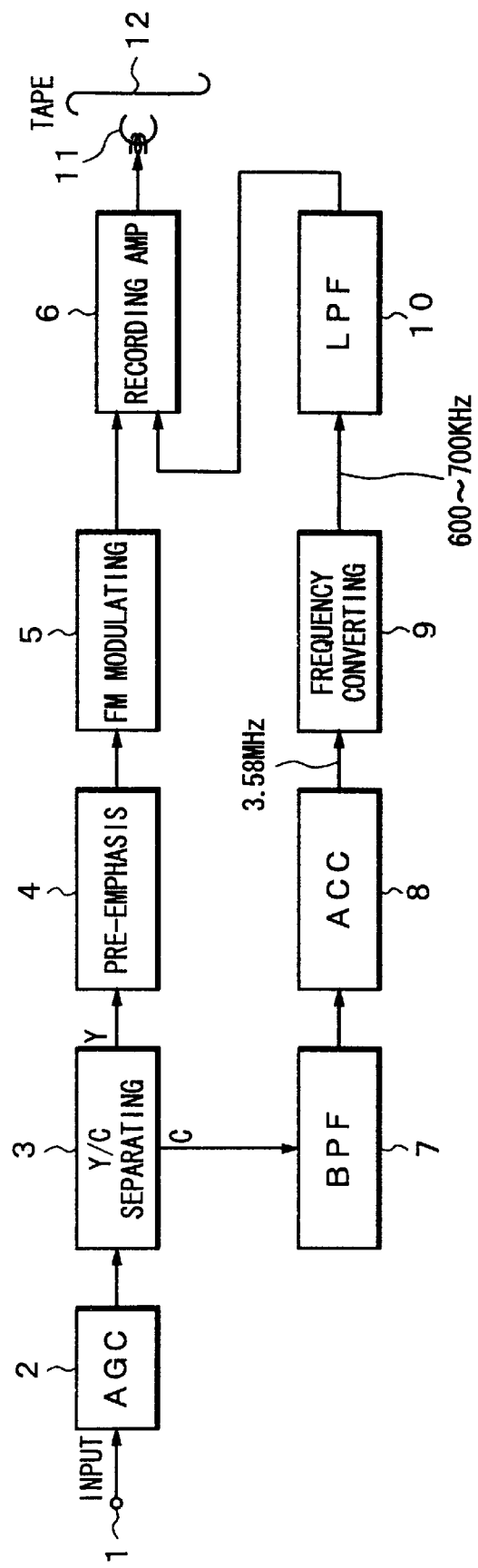
FIG. 4 is a block diagram of a video signal recording system in accordance with a typical VCR.

A video signal recording system of a typical VCR is shown in FIG. 4. A composite video signal to be recorded is supplied to the recording system through a terminal 1. The signal is passed from the terminal to an Automatic Gain Controller (AGC) 2, which adjusts the gain of the signal and passes the signal to a YC separating circuit 3. The YC separating circuit separates the composite video signal into a luminance signal, "Y", and a color signal, "C".

The luminance signal, Y, is supplied to a pre-emphasis circuit 4. The pre-emphasis circuit emphasizes the high frequency signal content of the luminance signal and supplies the pre-emphasized luminance signal to an FM modulating circuit 5. The FM modulating circuit applies frequency modulation to the pre-emphasized signal. The resultant FM pre-emphasized luminance signal is passed to a recording amplifier 6.

The color signal, C, is supplied to a Band Pass Filter (BPF) 7. The BPF filters the color signal and passes it to an Automatic Color Control (ACC) circuit 8. At the ACC circuit the level of the color signal is adjusted in accordance with a color burst signal. The signal output from the ACC is passed to a Frequency Converting circuit 9.

The purpose of the Frequency Converting circuit is to downconvert the color signal C to a frequency range that is within the recordable band of the VCR's magnetic tape. The sub-carrier frequency of the color signal is 3.58 MHz, which is above the frequency range of the tape. Accordingly, the Frequency Converter downconverts the color signal from its 3.58 MHz sub-carrier to a band ranging from 600 kHz to 700 kHz, which is within the frequency range of the tape.

After downconversion, the color signal is filtered by a low-pass filter 10 and passed to the recording amplifier 6. Thus, the recording amplifier is supplied with both the luminance signal Y and the frequency-converted color signal C. The amplifier passes these signals to a recording head 11 which records the signals onto a magnetic tape 12 in the form of helical tracks.

Figure 5:
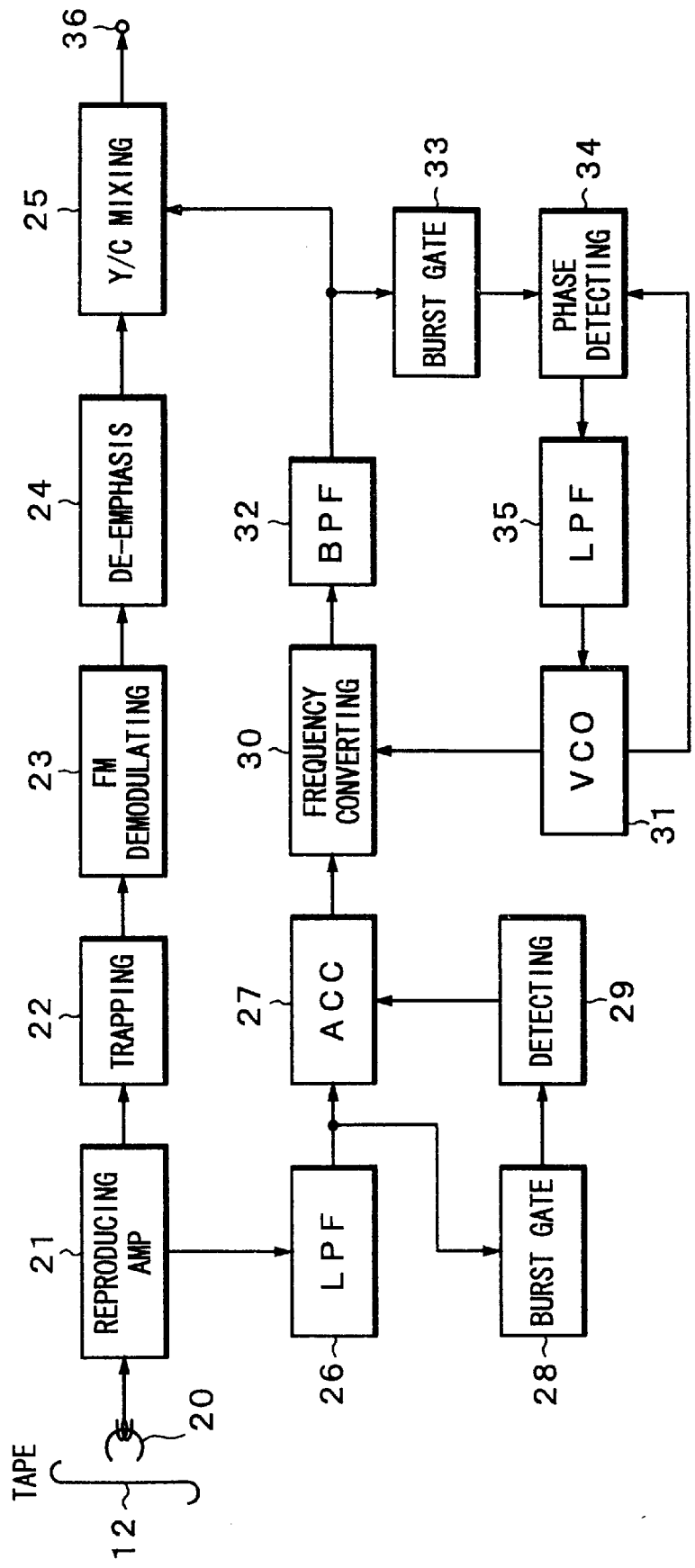
FIG. 5 is a block diagram of a video signal reproducing system corresponding to the video signal recording system of FIG. 4.

FIG. 5 shows a block diagram of a video signal reproducing system corresponding to the recording system of FIG. 4. A signal to be reproduced from the magnetic tape is read by a reproducing head 20. The signal read by the reproducing head is passed to a reproducing amplifier 21, which amplifies the signal and passes it to both a trapping circuit 22 and a low-pass filter 26.

The trapping circuit extracts the luminance portion (Y) of the reproduced signal to generate a reproduced luminance signal. The reproduced luminance signal is supplied to an FM demodulating circuit and, in turn, to a de-emphasis circuit 24. The FM demodulating circuit demodulates the signal and the de-emphasis circuit de-emphasizes the high frequency content of the signal. The resulting de-emphasized, demodulated reproduced luminance signal is passed to a YC mixing circuit 25.

The low-pass filter 26 extracts the color portion (C) of the signal reproduced from the tape to generate a reproduced color signal. The output of the low-pass filter is supplied to both an ACC circuit 27 and a burst gate 28. The burst gate extracts a color burst signal from the reproduced color signal and supplies the extracted color burst signal to a detecting circuit 29. The detecting circuit may be configured as, for example, a diode detecting system or a phase synchronous detecting system. In any event, the detecting circuit includes an integrating circuit so that the detecting circuit's output has a predetermined time constant. Accordingly, the detecting circuit outputs a signal representative of the integration of the color burst signals from a multiple of scan lines. This integrated color burst signal is passed from the detecting circuit to the ACC circuit where it is used to adjust the amplitude of the reproduced color signal.

The color signal that is output from the ACC is passed to a frequency converting circuit 30. As described above, prior to recording onto the magnetic tape, the color signal is downconverted from its sub-carrier frequency of 3.58 MHz. Accordingly, the purpose of frequency converting circuit 30 is to restore the color signal to its original 3.58 MHz sub-carrier frequency. In order to maintain the proper phase of the color signal upon restoration to 3.58 MHz, the upconversion is implemented through a phase locked loop (PLL). The primary elements of the phase locked loop are: the frequency converting circuit 30, a burst gate 33, a phase detecting circuit 34, and a voltage controlled oscillator (VCO) 31. A description of the PLL's operation follows.

The output of the frequency converting circuit is supplied to the burst gate 33 through a band-pass filter 32. The burst gate extracts a color burst signal from the upconverted color signal and passes the color burst signal to the phase detecting circuit. The phase detecting circuit compares the phase of the color burst signal with the phase of a reference signal output by the VCO—the reference signal having a nominal frequency of 3.58 MHz—and outputs a control voltage indicative of any difference between the two phases. The output of the phase detecting circuit is integrated by a low-pass filter 35 and passed to the VCO. The output frequency of VCO is deviated according to the control voltage output by the phase detector such that proper phase of the color signal is maintained throughout upconversion.

The upconverted color signal, as output from BPF 32, is passed to the YC mixing circuit 25. The YC mixing circuit mixes the luminance signal supplied from the de-emphasis circuit with the upconverted color signal and the resulting composite video signal is passed to a terminal 36.

As mentioned above, the color signal is downconverted for recording on to the magnetic tape and is upconverted upon reproduction from the magnetic tape. The downconverted color signal is low-pass filtered prior to recording on to the tape (by LPF 10) and is low-pass filtered again after being read from the tape (by LPF 26). The effect of this low-pass filtering is to distort the color signal, and therefore distort the color burst signal. In the context of the time domain, the effect of the low-pass filtering is to broaden the color burst signals.

Having described the operation of a typical VCR, a detailed description of particular embodiments of the invention will now be provided.

The present invention exploits the broadening effect that low-pass filtering has on the color burst signals to provide copy protection. More specifically, a special color burst signal (or "copy prohibition signal") is inserted into the signal to be protected at a position that is adjacent to the normal color burst signal (but not necessarily continuous with the normal color burst signal). Thereafter, when the protected signal is recorded and/or reproduced on a VCR such as that described in conjunction with FIGS. 4 and 5, the broadening effect of low-pass filtering causes the special color burst signal to interfere with the normal color burst signal, thereby prohibiting proper reproduction of the protected signal.

Figures 1A, 1B, 1C:
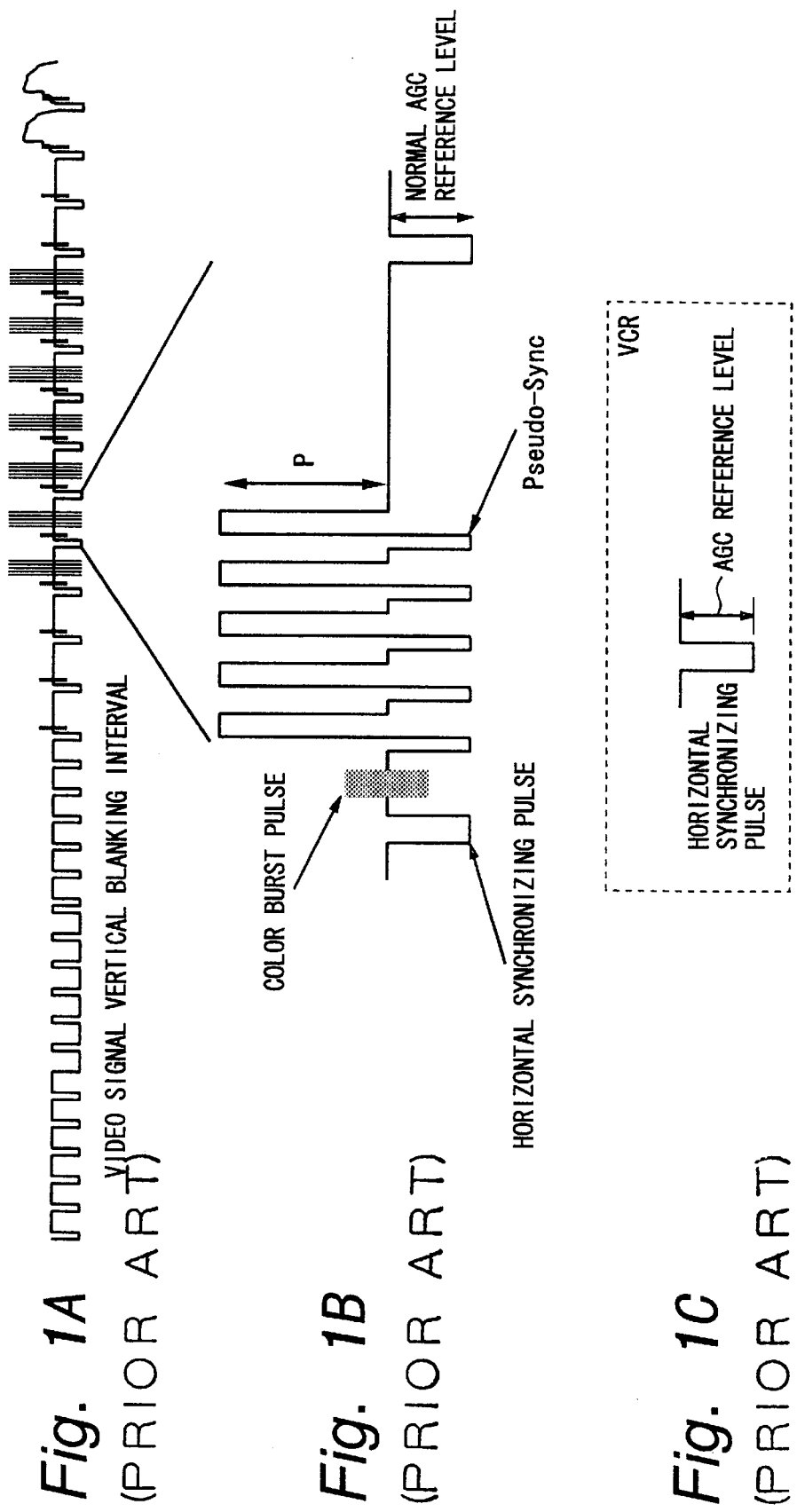
FIG. 1A illustrates a video signal during the vertical blanking interval of a video scan.
FIG. 1B is an enlarged view of a portion of the signal shown in FIG. 1A.
FIG. 1C shows how many current VCRs determine the AGC reference level.
Figure 2A:
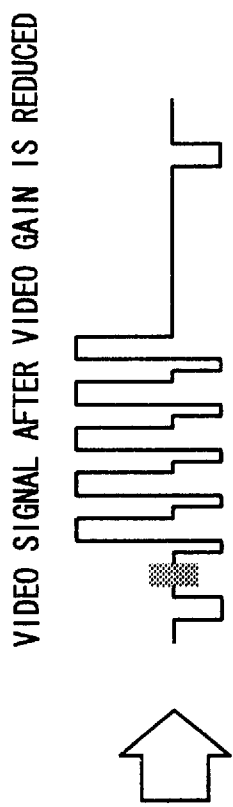
FIG. 2A is a signal diagram useful in describing how inserting pseudo sync pulses into a video signal results in erroneous determination of the AGC reference level.
Figure 2B:
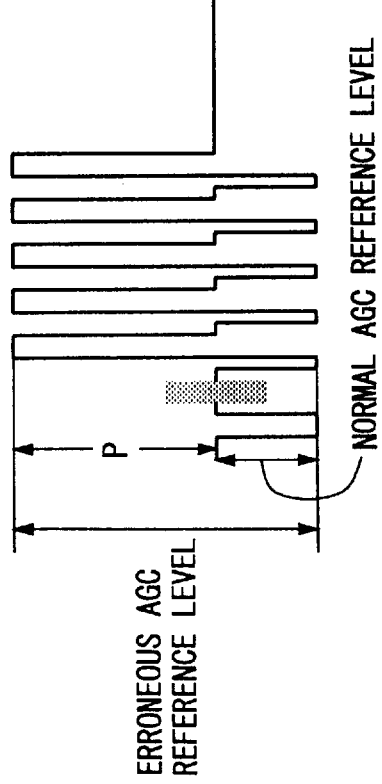
FIG. 2B is a signal diagram useful in describing the effects of inserting pseudo sync pulses into a video signal.
Figure 3:
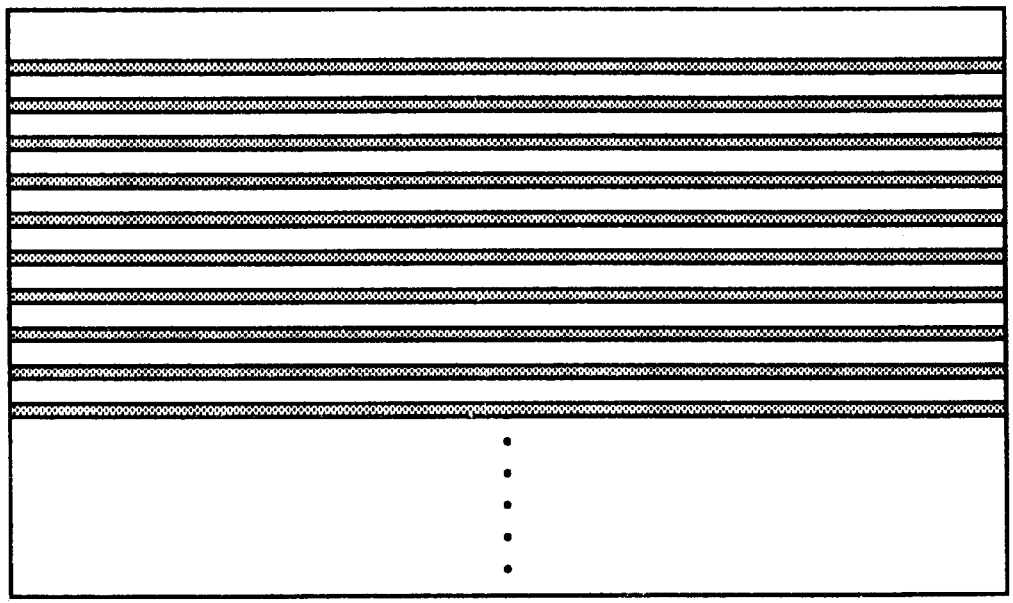
FIG. 3 shows the screen pattern that results when a typical VCR reproduces a video signal that has been processed according to the color stripe technique.
Figure 6A:
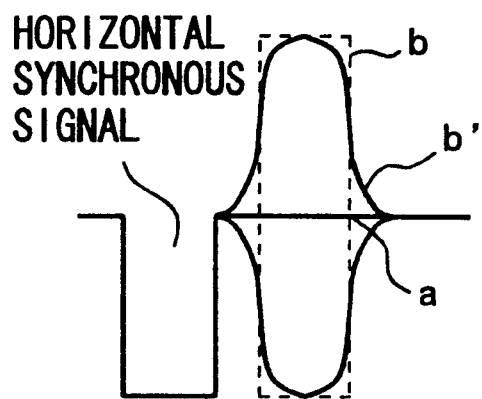
FIGS. 6A–6C illustrate how a special color burst signal interferes with a normal color burst signal in accordance with the invention.
Figure 6B:
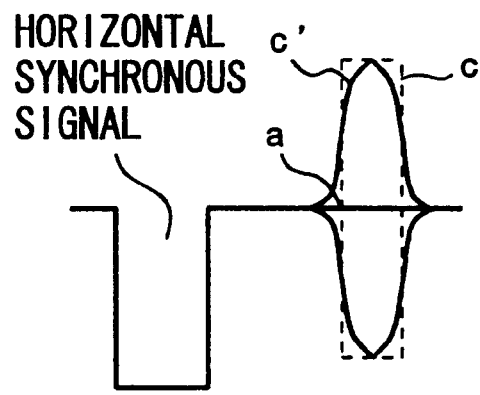
Figure 6C:
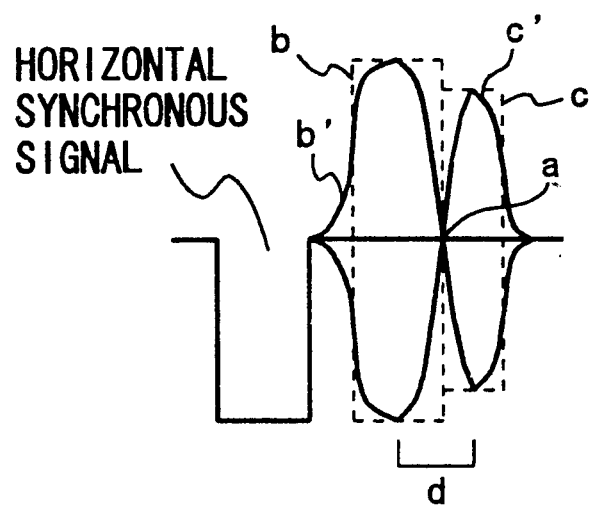

An illustration of how the special color burst signal interferes with the normal color burst signal is provided in FIGS. 6A–6C. For purposes of comparing FIGS. 6A–6C it should be noted that the letter "a" appearing in each of the figures denotes a point in time, and that the point in time denoted by "a" is the same for each figure. In FIG. 6A, an idealized normal color burst signal is indicated by the dotted line, "b", and a broadened normal color burst signal (resulting from low-pass filtering) is shown by a solid line, "b'". As described with respect to FIG. 1B, the normal color burst signal follows a horizontal synchronous signal.

FIG. 6B shows an idealized special color burst signal, "c", in accordance with the invention. A broadened special color burst signal, "c'", is also shown. A comparison of FIGS. 6A and 6B shows that the special color burst signal occurs at a time immediately following the normal color burst signal, and thus the two signals are said to be "adjacent".

FIG. 6C shows the effects of combining the normal color burst signal of FIG. 6A with the special color burst signal of FIG. 6B. In FIG. 6C, an idealized combined color burst signal is denoted by doted lines "b+c", and a broadened combined color burst signal is denoted by solid lines "b'+c'". The area within which the two color burst signals interfere with each other is denoted by the letter "d". As can be seen by comparing FIG. 6C to FIG. 6A, the interference from the broadened special color burst signal effectively reduces the width of the broadened normal color burst signal. The narrowing of the normal color burst signal results in a distorted reproduction of the protected video signal, and in this manner the satisfactory recording and playback of unauthorized copies of the protected signal is prohibited.

The narrowing effect on the normal color burst signal is observed whenever the special color burst signal varies from the normal color burst signal in frequency, phase, and/or amplitude. However, an additional interference effect is observed in certain cases of varying phase and in the case of varying amplitude. The additional interference is related to the ACC elements (8 and 27) of the typical VCR.

For purposes of illustrating how the phase of the special color burst signal may interfere with the ACC elements, the phase of the special color burst signal is considered to differ from the phase of the normal color burst signal by 180°. In such a case, the interference between the color burst signals due to low-pass filtering results in a decrease in amplitude of the normal color burst signal. Thus, the amplitude of the normal color burst signal received by the ACC elements is lower than the actual amplitude of the normal color burst signal. Therefore, the ACC elements erroneously increase the color signal gain and the reproduced image becomes distorted.

A similar effect is observed when the amplitude of the special color burst signal is set at a level below the amplitude of the normal color burst signal. As in the 180° relative phase case, in the reduced amplitude case, the interference between the color burst signals due to low-pass filtering results in a decrease in amplitude of the normal color burst signal. Accordingly, as in the 180° relative phase case, the ACC elements erroneously increase the color signal gain and the reproduced image becomes distorted.

When the amplitude of the special color burst signal is set at a level above the amplitude of the normal color burst signal, the reproduced image is distorted in an inverse fashion. More particularly, when the amplitude of the special color burst signal is set at a level above the amplitude of the normal color burst signal, the interference between the color burst signals due to low-pass filtering results in an increase in amplitude of the normal color burst signal. Accordingly, the ACC elements erroneously decrease the color signal gain and the reproduced image becomes distorted.

At this point two important notes should be made. First, it should be noted that a protected signal which includes a special color burst signal in accordance with the invention can be played back on a typical TV receiver or monitor without distortion. In typical TVs, the low-pass filters through which the color signal C is passed have a wider bandwidth than the low-pass filters of typical VCRs. Thus, the broadening of color burst signals caused by the TV filters is minimal, and therefore the special color burst signal and the normal color burst signal do not significantly interfere with each other in TVs. Accordingly, display of a protected signal on a TV is distortion free.

Second, it should be noted that in a preferred embodiment of the invention the characteristics (e.g. position, width, frequency, phase, and amplitude) of the special color burst signal are set so as not to effect the ACC calculations of TVs. For example, if for a given video signal the ACC gain for an undistorted normal color burst signal is "g", the amplitude of the special color burst signal is set to a level that yields an ACC gain of "g" when the combined color burst signal is processed by a TV. Thereby, eliminating any possible playback distortion due to erroneous ACC calculations.

Figure 7A:
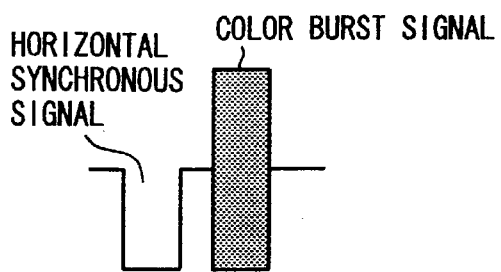
FIG. 7A is a signal diagram showing a normal color burst signal as included within a video signal at a position immediately following a horizontal synchronous signal.

Referring now to FIGS. 7B–7E, there are shown several signal diagrams depicting various combinations of normal and special color burst signals in accordance with the invention. FIG. 7A is provided for purposes of comparison to FIGS. 7B–7E. In FIG. 7A only a normal color burst signal (in its normal position relative to a horizontal synchronous signal) is included in the video signal and thus the figure illustrates the case of an unprotected signal.

Figure 7B:
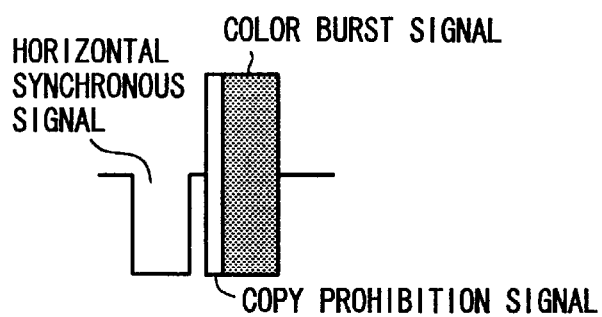
FIGS. 7B–7E are signal diagrams showing various combinations of normal color burst signals and special color burst signals in accordance with the invention.

FIG. 7B shows an example in which a special color burst signal (or "copy prohibition signal") is placed between the horizontal synchronous signal and the normal color burst signal. In FIG. 7B, the phase and/or frequency of the special color burst signal differs from the phase and/or frequency of the normal color burst signal.

Figure 7C:
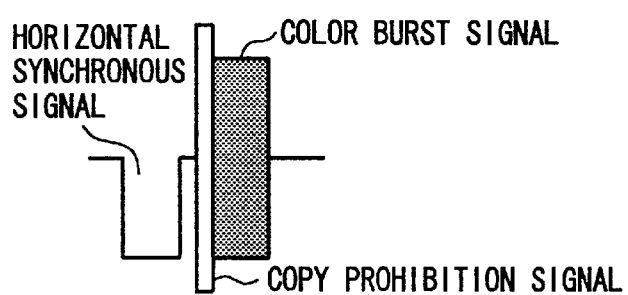

Similarly, FIG. 7C shows an example in which a special color burst signal is placed between the horizontal synchronous signal and the normal color burst signal. In FIG. 7C, however, the amplitude of the special color burst signal is larger than the amplitude of the normal color burst signal. In addition to its amplitude variation with respect to the normal color burst signal, the special color burst signal of FIG. 7C may include phase and/or frequency variations with respect to the normal color burst signal. Furthermore, although FIG. 7C shows the special color burst signal as having an increased amplitude relative to the normal color burst signal, it is possible for the special color burst signal to have decreased amplitude relative to the normal color burst signal.

Figure 7D:
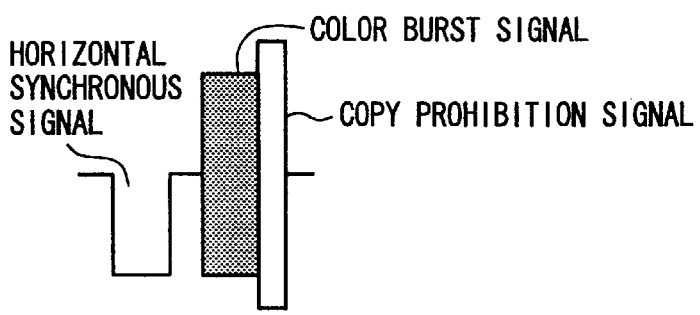

FIG. 7D shows an example in which a special color burst signal is placed after the normal color burst signal. In the FIG. 7D example, the amplitude of the special color burst signal is larger than the amplitude of the normal color burst signal. As pointed out in connection with FIG. 7C, the special color burst signal may additionally vary in phase and/or frequency variations with respect to the normal color burst signal; and moreover, the amplitude of the special color burst signal may be smaller than the amplitude of the normal color burst signal.

Figure 7E:
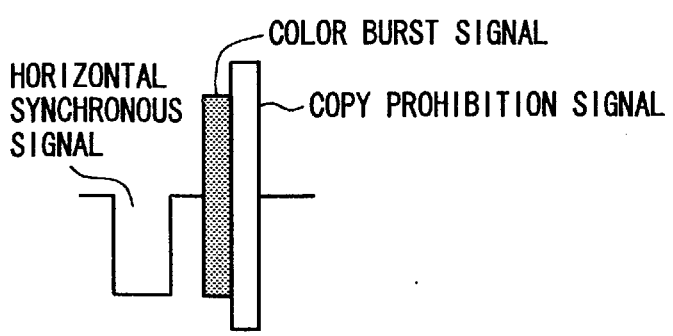

FIG. 7E shows an example in which the width of the normal color burst signal is decreased and a special color burst signal is placed after the reduced width normal color burst signal. As pointed out in connection with FIGS. 7C and 7D, the special color burst signal may additionally vary in phase and/or frequency with respect to the normal color burst signal; and moreover, the amplitude of the special color burst signal may be smaller than the amplitude of the normal color burst signal.

Combined color burst signals in accordance with the invention, examples of which are shown in FIGS. 7B–7E, may be formed in many ways. One technique to form the combined signals is to replace a portion of the normal color burst signal and/or a portion of the video signal adjacent to the normal color burst signal with the special color burst signal. Another technique is to modulate the normal color burst signal and/or a portion of the video signal adjacent to the normal color burst signal. Still another technique is to provide an oscillator that is synchronized to the normal color burst signal, an oscillator for generating the special color burst signal, and circuitry for substituting the signals generated by the oscillators into desired positions within the video signal to be protected.

Regarding the application of special color burst signals, special color burst signals are preferably included in several successive lines within a video scan, but not in all lines within that scan. By intermittently inserting the special color burst signals (the "intermittent-by-line" technique), the distortion that results from the special color burst signals is augmented in that the distortion appears in a horizontal stripe pattern. As an option, special color burst signals may be placed in all of the horizontal scan lines of some fields and in none of the horizontal scan lines of other fields. For example, special color burst signals may be placed in all of the horizontal scan lines of even fields and in none of the horizontal scan lines of odd fields. The result of such intermittent-by-field placement is a flickering of the display upon reproduction. Of course, another application option is to use a combination of the intermittent-by-line and intermittent-by-field techniques.

At this point it should be mentioned that it is not necessary to use only one type of color burst signal when protecting a video signal. In other words, when protecting a video signal it is not necessary to use the same type of color burst signal (e.g. the signal shown in FIG. 7C) throughout the video signal. A multiple of patterns (e.g. those shown in FIGS. 7B–7E) may be used, and switching between the patterns may be, for example, on a line-by-line basis or a field-by-field basis.

Moreover, it should be mentioned that the intermittent-by-field technique may be implemented through the exclusive use of special color burst signals having the same amplitude as the normal color burst signal. That is, special color burst signals such as that shown in FIG. 7B may be used to implement intermittent-by-field protection. In such an implementation, for those fields that include the special color burst signals, the width of the normal color burst signals is decreased, and therefore the ACC gain is too high. The gain difference between the fields including the special color burst signals and the fields that do not include the special color burst signals causes the displayed reproduction to flicker.

Figure 8:
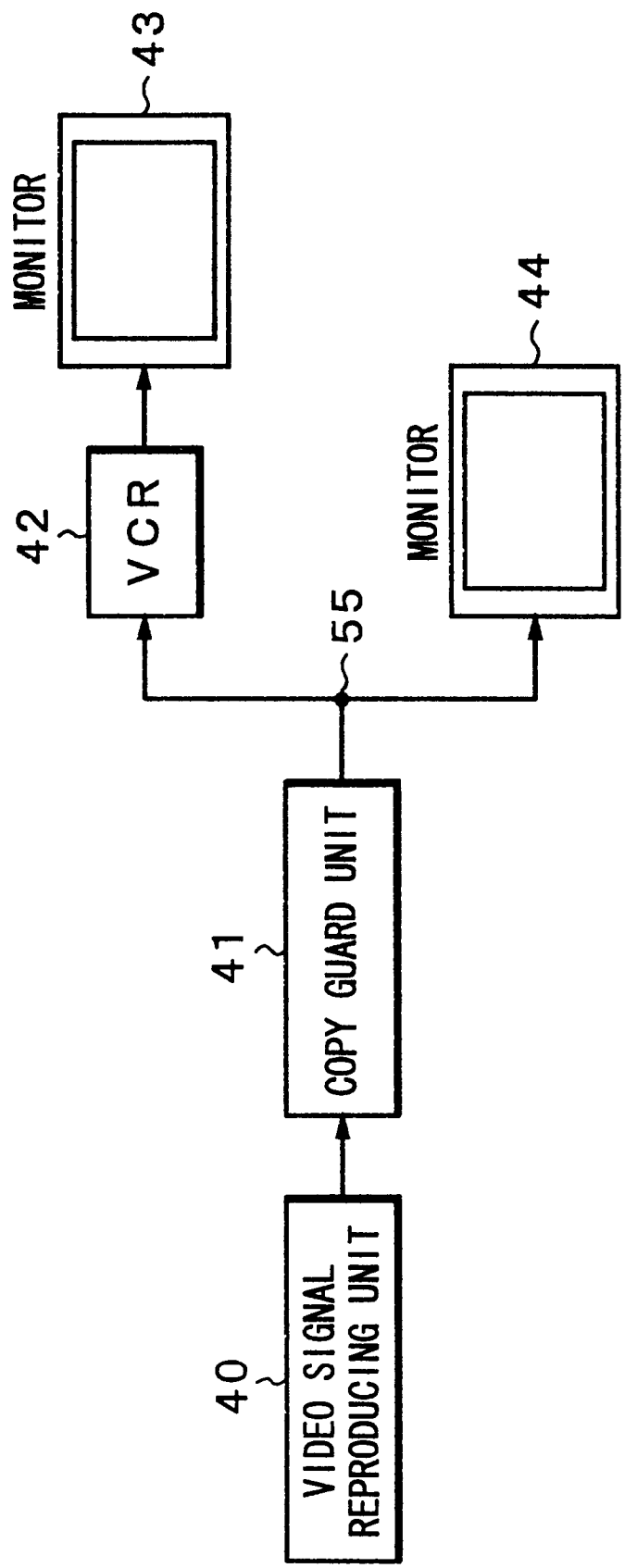
FIG. 8 is a block diagram of a system for producing protected video signals according to the present invention and for processing the protected video signals.

FIG. 8 is a block diagram of a preferred system for producing protected video signals according to the present invention and for processing the protected video signals. The system includes a video signal reproducing unit 40 for reproducing a video signal, and a copy guard unit 41 for protecting the reproduced video signal. Examples of suitable reproducing units include an analog VCR, a digital VCR, a digital video disc (DVD) player, and a television tuner. When a television tuner is used, the reproducing unit does not reproduce the video signal from a storage medium, but rather, reproduces the video signal from a received broadcast signal. In any event, the reproduced video signal includes a normal color burst signal in a predetermined position (e.g. as shown in FIG. 7A).

Figure 9:
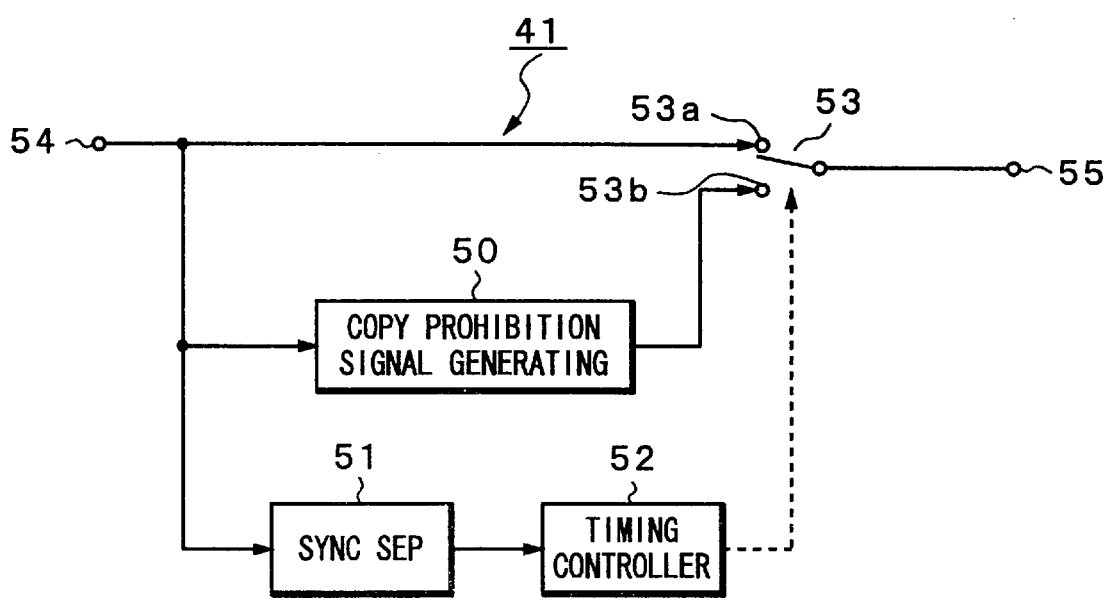
FIG. 9 is a block diagram of the copy guard unit shown in FIG. 8.

The copy guard unit 41 is shown in detail in FIG. 9. As can be seen from FIG. 9, the copy guard unit includes a copy prohibition signal generating circuit 50, a horizontal sync separating circuit 51, a timing controller 52, and a switch 53. When the copy guard unit is operating, the copy prohibition signal generating circuit generates special color burst signals which are inserted into the reproduced video signal according to the actuation of switch 53 by the timing controller.

In order to generate the proper timing signals for insertion of the special color burst signals, video signals from the video signal reproducing unit are supplied to the sync separating circuit 51. In a preferred embodiment, the sync separating circuit extracts the horizontal synchronous signal from the video signal and passes the extracted signal to the timing controller. Based on the received horizontal synchronous signal the timing controller controls switch 53 such that the special color burst signals are inserted into the reproduced video signal at a predetermined time after occurrence of the horizontal synchronous signal.

Terminal 54 is supplied with the reproduced video signal and couples same to sync separating circuit 51 and to copy prohibition signal generating circuit 50. The special color burst signals generated by the copy prohibition signal generating circuit are supplied to terminal 53b of switch 53. These signals may take many forms (e.g. those shown in FIGS. 7B–7E) and they may be applied to the reproduced video signal in many ways (e.g. intermittent-by-line or intermittent-by-field).

The reproduced video signal is also supplied to terminal 53a of switch 53. In the "default" position, switch 53 is positioned to couple terminal 53a to terminal 55. However, at the point in the reproduced video signal where a special color burst signal is to be inserted, switch 53 (in response to a signal from timing controller 52) changes position to couple terminal 53b to terminal 55. In this manner, a protected video signal is generated at terminal 55.

Referring back to FIG. 8, it can be seen that the protected video signal supplied to terminal 55 is passed along two paths, a first path having a VCR 42 and TV monitor 43, and a second path having only a TV monitor 44. As described above, when the protected video signal is recorded by VCR 42, the filtering performed by the VCR causes the special color burst signal to interfere with the normal color burst signal, and therefore when an attempt is made to reproduce the recorded protected signal for display on monitor 43, the reproduced signal is distorted. On the other hand, since normal processing of the protected signal by monitor 44 does not result in interference between the special color burst signal and the normal color burst signal, display of the protected signal on monitor 44 is not distorted.

Regarding FIG. 8, it should be noted that the two paths along which the reproduced video signal is passed are provided to illustrate the operation of the copy protection algorithm of the invention. It is not necessary for a system to include both paths in order to play back protected video signals. Furthermore, it should be noted that in FIG. 8 the video signal reproducing unit 40 and copy guard unit 41 are shown as being distinct from one another. The two units are shown separately only for purposes of illustration and they need not be separately implemented. Indeed, it is preferable to integrate the video signal reproducing unit and copy guard unit so that the functions of the two units are performed by a single integrated unit. That is, it is preferred to incorporate the copy guard unit into the video signal reproducing unit.

While the present invention has been particularly shown and described in conjunction with preferred embodiments thereof, it will be readily appreciated by those of ordinary skill in the art that various changes may be made without departing from the spirit and scope of the invention. Moreover, while particular circuits and algorithms have been described as performing various operations, the present invention is not limited solely thereto and other types of circuits, algorithms and/or types of signals may be used. Therefore, it is intended that the appended claims be interpreted as including the embodiments described herein, the alternatives mentioned above, and all equivalents thereto.

What is claimed is:

1. Apparatus for copy protecting a video signal that includes a normal color burst signal, comprising:

means for generating a special color burst signal; and means for inserting said special color burst signal into said video signal to generate a protected video signal;

wherein the phase of said special color burst signal is different from the phase of said normal color burst signal by about 180°, and wherein said special color burst signal is inserted into said video signal such that said special color burst signal and said normal color burst signal are substantially continuous in time and such that the effective time domain duration of said normal color burst signal is reduced upon recording and/or reproducing of said protected video signal by a recording, reproducing device; and wherein the amplitude of said special color burst signal is substantially the same as the amplitude of said normal color burst signal.

2. The apparatus according to claim 1, wherein said at least one characteristic is phase.

3. The apparatus according to claim 1, wherein said at least one characteristic is frequency.

4. The apparatus according to claim 1, wherein said video signal includes a plurality of video fields and said means for inserting is operable to position said special color burst signal within one or more predetermined video fields of said video signal.

5. The apparatus according to claim 1, wherein said video signal includes a plurality of scan lines and said means for inserting is operable to position said special color burst signal within one or more predetermined scan lines of said video signal.

6. Apparatus for copy protecting a video signal that includes a plurality of even video fields and a plurality of odd video fields, each of said even fields and said odd fields having a normal color burst signal, comprising:

means for generating a special color burst signal; and means for inserting said special color burst signal into said video signal to generate a protected video signal by making the effective duration of said normal color burst signals in said even fields different from the effective duration of said normal color burst signals in said odd fields;

wherein said special color burst signal is inserted into a selected one of said plurality of even fields and plurality of odd fields such that said special color burst signal and said normal color burst signal for each field of said selected plurality of fields are substantially continuous in time and such that the effective time domain duration of said normal color burst signal is reduced upon recording and/or reproducing of said protected video signal by a recording, reproducing device; and wherein the amplitude of said special color burst signal is substantially the same as the amplitude of said normal color burst signal.

7. A method for copy protecting a video signal that includes a normal color burst signal, comprising the steps of:

generating a special color burst signal; and inserting said special color burst signal into said video signal to generate a protected video signal;

wherein the phase of said special color burst signal is different from the phase of said normal color burst signal by about 180°, and wherein said special color burst signal is inserted into said video signal such that said special color burst signal and said normal color burst signal are substantially continuous in time and such that the effective time domain duration of said normal color burst signal is reduced upon recording and/or reproducing of said protected video signal by a recording, reproducing device; and wherein the amplitude of said special color burst signal is substantially the same as the amplitude of said normal color burst signal.

8. Apparatus for copy protecting a video signal that includes a normal color burst signal, comprising:

a copy guard unit for generating a special color burst signal and inserting said special color burst signal into said video signal to generate a protected video signal;

wherein said special color burst signal differs from said normal color burst signal in at least one of a frequency, a phase and an amplitude characteristic, and wherein said special color burst signal is inserted into said video signal such that said special color burst signal and said normal color burst signal are substantially continuous in time and such that the effective time domain duration of said normal color burst signal is reduced upon recording and/or reproducing of said protected video signal by a recording, reproducing device, and wherein the amplitude of said special color burst signal is substantially the same as the amplitude of said normal color burst signal.

* * * * *

UNITED STATES PATENT AND TRADEMARK OFFICE
CERTIFICATE OF CORRECTION

PATENT NO. : 6,222,978 B1
DATED : April 24, 2001
INVENTOR(S) : Hirai

It is certified that error appears in the above-identified patent and that said Letters Patent is hereby corrected as shown below:

Item [30]  Foreign Application Priority Data

May 11, 1996 [JP]    Japan......................... 8-140750

Signed and Sealed this

Eleventh Day of September, 2001

Attest:

*Nicholas P. Godici*

NICHOLAS P. GODICI
*Attesting Officer*   *Acting Director of the United States Patent and Trademark Office*